Figure 1:
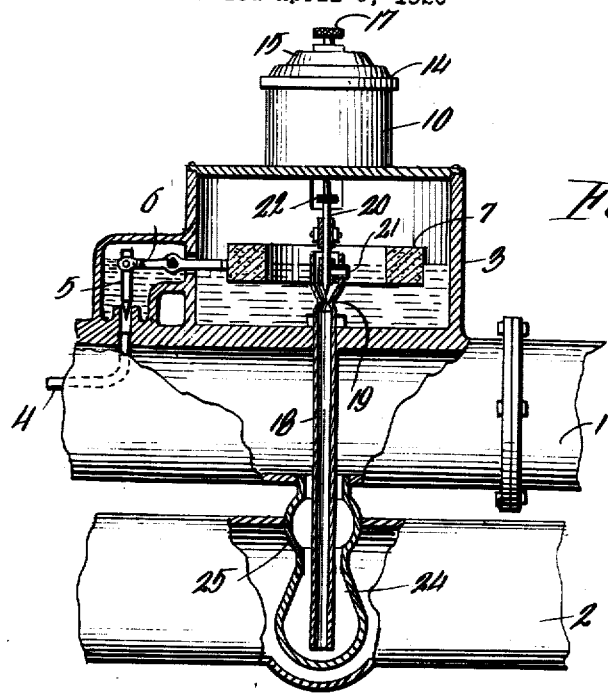

Jan. 1, 1924

R. W. KAMBAK

CARBURETOR

Filed April 6, 1920

1,479,547

WITNESSES
Guy M. Spring
O. B. Hillyard

Inventor
ROBERT W. KAMBAK

By Richard B. Owen
Attorney

Patented Jan. 1, 1924.

1,479,547

UNITED STATES PATENT OFFICE.

ROBERT W. KAMBAK, OF HIGHMORE, SOUTH DAKOTA.

CARBURETOR.

Application filed April 6, 1920. Serial No. 371,580.

*To all whom it may concern:*

Be it known that I, ROBERT W. KAMBAK, a citizen of the United States, residing at Highmore, in the county of Hyde and State of South Dakota, have invented certain new and useful Improvements in a Carburetor, of which the following is a specification.

This invention provides a carburetor designed chiefly for vaporizing kerosene and analogous heavy hydrocarbon whereby the same may be advantageously and successfully used in the operation of the internal combustion engines thereby economizing in the cost of operation.

In accordance with the present invention, the kerosene or analogous fuel is supplied in regulated quantities to a chamber disposed in the path of the exhaust whereby the fuel is vaporized and commingles with the air on its way to the engine thereby producing the gaseous mixture which is utilized as the fuel medium in the operation of an internal combustion engine.

The drawings illustrate a preferred embodiment of my invention. I desire it to be understood, that in adapting the same to meet different conditions, various changes in the form, proportion and minor details of construction may be resorted to without departing from the nature of the invention as claimed hereinafter.

Figure 2:
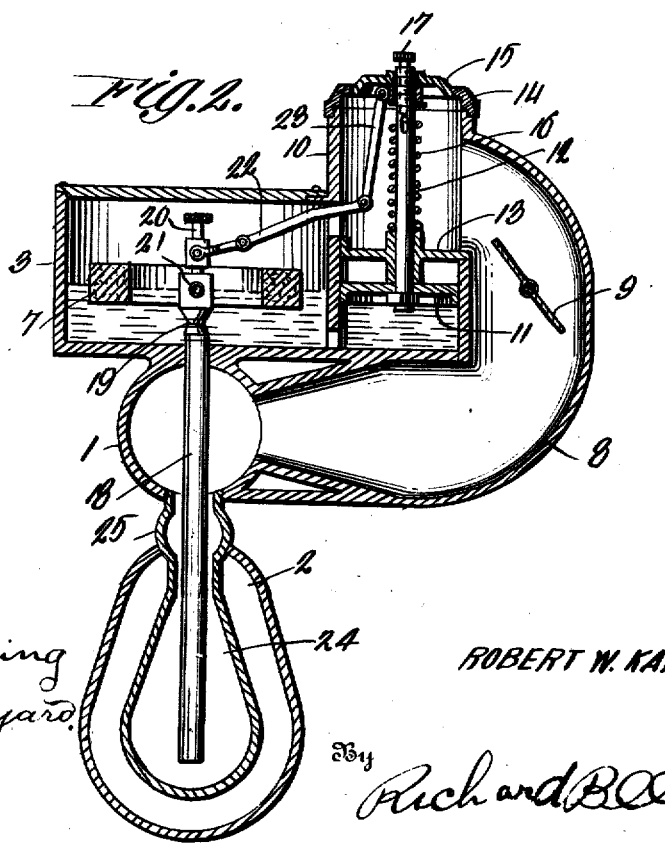

Referring to the drawings,

Figure 1 is a sectional detail of a carburetor embodying the invention showing the same in operative position, Figure 2 is a sectional detail at right angles to Fig. 1.

Corresponding and like parts are referred to in the following description and indicated in both views of the drawings by like reference characters.

Referring to the drawings, the numeral 1 designates an intake manifold and 2 an exhaust manifold. These manifolds may be of any relative construction and arrangement, however, it is preferred to have the intake manifold 1 disposed above the exhaust manifold 2 and in close relation thereto.

The fuel in the chamber 3 of the carburetor is located above the intake manifold and the fuel is fed thereto automatically in a manner well understood in the construction of carburetors. The fuel pipe 4 leads from any suitable source of supply and its outlet is controlled by means of a needle valve 5 which is connected with the float lever 6 in a manner well understood. The float 7 is disposed within the fuel chamber 3 of the carburetor and is controlled by the change of level of the fuel therein. When the float 7 is at the proper position the valve 5 is set thereby cutting off the supply of fuel. When the float 7 descends by the lowering of the level of the fuel in the fuel chamber 3 the valve 5 unseats and permits a proper supply of fuel to pass into the fuel chamber 3. A passage 8 is located at one side of the fuel chamber 3 and forms a part thereof and opens into the intake manifold 1. A throttle valve 9 is located in the passage 8 and controls the amount of air passing therethrough. A chamber 10 is located intermediate the fuel chamber 3 and passage 8 and is in communication with each. The lower portion of the chamber 10 constitutes a dash pot and a piston 11 is arranged to operate therein. A stem 12 is connected at its lower end with the piston 11 and operates through a boss formed centrally in a partition 13 which divides the chamber 10 so as to form the top of the dash pot. A ring 14 is secured to the upper end of the chamber 10 and constitutes a valve seat for a valve 15 which is carried by the upper end of the stem 12 and closes upwardly and opens downwardly. An expansible helical spring 16 mounted on the stem 12 normally exerts an upward pressure to hold the valve 15 seated and the tension of this spring may be regulated so as to offer a greater or less resistance to the unseating of the valve 15. Any suitable means may be provided for regulating the tension of the spring 16, said means being controlled by a thumb screw or analogous element 17.

A tube 18 extends through the bottom of the carburetor and projects upwardly a short distance into the fuel chamber 3. The tube 18 passes through the intake manifold 1 and extends downwardly therefrom. The tube 18 at a point a short distance above the bottom of the fuel chamber is contracted as indicated at 19 to form a seat for a valve 20 which controls the outflow of the fuel from the carburetor through the tube 18. A lateral outlet 21 is provided in a side of the tube 18 above the valve seat 19. When the valve 20 is moved upwardly the port constituting the lateral outlet 21 is uncovered so that the fuel may pass from the fuel chamber 3 into the tube 18. When the valve 20 is lowered, the supply of fuel to the tube 18 is cut off. The valve 20 is carried by a lever 22 which is fulcrumed intermediate of its ends to the body of the carburetor. A link 23 connects the lever 22 with the upper end of the stem 12. Obviously a downward movement of the stem 12 will effect an unseating of the valve 20. The lower end of the tube 18 extends into a chamber 24 which extends into the exhaust manifold 2 and which has its upper portion connected to the lower portion of the intake manifold 1. The chamber 24 is closed at its lower end and opens into the intake manifold 1 at its upper end. The chamber 24 is enlarged intermediate its upper and lower ends as indicated at 25 whereby provision is had for expansion of the fuel when vaporized by the action of the heat.

The manifolds 1 and 2 are connected with the engine in any preferred way but in accordance with the present invention said manifolds preferably are disposed one above the other. On the suction stroke of a piston a vacuum is created in the intake manifold 1 and in the passage 8 of the carburetor. This results in an unseating of the valve 15 whereby air is drawn into the chamber 10, passage 8 and intake manifold 1. As the valve 15 unseats by a downward movement, the fuel valve 20 is unseated by an upward movement. A certain amount of fuel passes from the fuel chamber 3 of the carburetor into the tube 18 and is delivered into the chamber 24 in which it is vaporized by the heat resulting from the exhaust gases passing through the exhaust manifold 2. As the fuel is vaporized in the chamber 24 it rises and passes therefrom into the intake manifold and mixes with air passing therethrough, thereby forming the gaseous mixture which is utilized as the fuel medium for operating the internal combustion engine.

Having thus fully described my invention what I claim as new and desire to secure by Letters Patent, is:—

1. The combination with an exhaust and an intake manifold disposed one above the other in vertical alignment, of a carburetor including a fuel chamber, means for controlling the flow of fuel into the chamber, means connecting the chamber with one side of the intake manifold, an enlarged heating chamber disposed in the exhaust manifold and communicating with the intake manifold at a point adjacent the means connecting the fuel chamber with the intake manifold, a supply tube leading from the fuel chamber through the intake manifold and into the heating chamber, and valve means for controlling the flow of fuel from the fuel chamber into said heating chamber through said pipe.

2. The combination with an intake and an exhaust manifold disposed in relative close proximity and in vertical alignment, of a carburetor including a fuel chamber associated with the upper surface of the intake manifold, means for controlling the flow of fuel into the chamber, a pipe connecting the chamber with the intake manifold, an air intake suction operated valve disposed in the pipe, an enlarged chamber disposed in the exhaust manifold and adapted to be heated by the exhaust gases, means connecting the chamber with the intake manifold at a point adjacent the pipe, a depending tube communicating with the body and extending through the intake manifold and into the chamber, a valve for controlling the flow of fuel from the fuel chamber into the tube, and means operatively connecting the suction operated air valve with said last mentioned valve, to permit the automatic operation thereof.

In testimony whereof I affix my signature in presence of two witnesses.

ROBERT W. KAMBAK.

Witnesses:
 THEO. H. J. STUDT,
 C. C. KAMBAK.